United States Patent [19]

Dabich

[11] Patent Number: 4,694,619
[45] Date of Patent: Sep. 22, 1987

[54] PIT COVER ASSEMBLY WITH FLOOD PROTECTION

[76] Inventor: Kathyleen A. Dabich, 7212 Patterson Dr., Garden Grove, Calif. 92640

[21] Appl. No.: 849,543

[22] Filed: Apr. 8, 1986

[51] Int. Cl.⁴ .......................... F16L 5/00; E02D 29/14
[52] U.S. Cl. ......................................... 52/20; 137/371; 404/25
[58] Field of Search ..................................... 52/19–21; 137/371, 363, 800; 404/25, 26

[56] References Cited

U.S. PATENT DOCUMENTS

| | | | |
|---|---|---|---|
| 2,624,307 | 1/1953 | Caffrey | 404/25 X |
| 2,828,762 | 4/1958 | Swank | 52/20 X |
| 3,220,433 | 11/1965 | Steil | 137/363 |
| 3,482,030 | 12/1969 | Wisniewski | 137/371 X |
| 3,938,545 | 2/1976 | Nagy et al. | 52/21 |
| 4,213,111 | 7/1980 | Lux | 52/20 X |
| 4,593,714 | 6/1986 | Madden | 52/20 |

FOREIGN PATENT DOCUMENTS 165207  2/1950  Austria .................................. 52/20

Primary Examiner—J. Karl Bell
Attorney, Agent, or Firm—Charles H. Thomas

[57] ABSTRACT

The pit cover assembly for a prefabricated pit for servicing aircraft is provided with an inverted concave cup, or hood, hingedly connected to the underside of the pit cover. The concave cup has a mouth which opens downwardly when the pit cover is closed. The cup is adapted to receive water sensitive articles or equipment. Because the mouth of the cup is directed downwardly, the inverted cup forms an air pocket or bubble chamber which will not fill with water even when the pit is flooded. The water sensitive equipment is thereby maintained in isolation from surrounding water within the air pocket, even during conditions of flooding.

9 Claims, 5 Drawing Figures

PIT COVER ASSEMBLY WITH FLOOD PROTECTION

BACKGROUND OF THE INVENTION

1. Field of the Invention

The present invention relates to sub-surface, equipment housing devices, and particularly to prefabricated pits designed for use in servicing aircraft at docking, loading and refueling terminals.

2. Description of the Prior Art

Servicing of aircraft on the ground at modern airport terminals is frequently performed using prefabricated pits which are installed at aircraft docking, fueling and loading areas. The pre-fabricated pits are installed beneath the surface of the tarmac across which aircraft travel during docking, refueling and departure maneuvers. The pits are typically formed of fiberglass, steel or aluminum, and are constructed as enclosures with surrounding walls, a floor, and an access cover at the top of the walls. The pits are installed below the surfaces of loading and refueling aprons at aircraft terminals, remote parking locations and maintenance bases.

Pre-fabricated pits of this type are used to allow ground support functions to be carried out from sub-surface enclosures. These ground support functions include the provision of fuel, the provision of electricity to aircraft located in the docking area, the provision of air for cooling the aircraft interior and pressurizing air for starting engines of the aircraft, and for other aircraft support activities which are conducted on the ground. The use of sub-surface pits eliminates the need for mobile trucks, carts and other vehicles which are otherwise present in the loading area and which interfere with the arrival and departure of aircraft in the vicinity of the loading gate. The use of sub-surface pits allows the provision of fuel, power, cooling and pressurized air, and other supplies from a central location. The necessary fluid supplies and electrical power can be generated or stored with great efficiency at a central location, as contrasted with the conduct of such ground support functions from mobile generating or supply vehicles.

The sub-surface, pre-fabricated pits used for ground support functions typically house valves, electrical plugs, junction boxes, cooling air terminations and other terminal equipment used to service aircraft that have been docked. Umbilical pipes and lines, and electrical conduits otherwise stored within the pits, are withdrawn from the pits through hatches therein and are coupled to the docked aircraft to supply the aircraft with fuel, air for cooling the aircraft interiors, pressurized air for starting the engines and electrical power.

One problem in connection with conventional sub-surface pit assemblies is the possibility of exposure of instruments, equipment and especially electrical power outlets and electrically operated devices to water due to flooding. Sub-surface pits are normally exposed to a variety of weather conditions. Despite pit designs which attempt to make such servicing pits waterproof, quite frequently leaks in the pits will develop, especially after the pits have been in service for several years.

Pits are designed and constructed so as to be able to withstand pressure from normal water table conditions so that the pits do not flood and so that the equipment within the pits does not become submerged. However, even with high quality, waterproof pit designs, a sub-surface aircraft servicing pit, will, upon some occasions, be subjected to such extreme flooding conditions that even the best pits commercially available are not flood-proof. When servicing pits flood significant problems develop within water sensitive equipment and articles, and electrical equipment and outlets in particular. Short circuits develop within the system, and the equipment in the pit is rendered useless, at least temporarily, and the equipment frequently is severly damaged. Moreover, with electrical short circuits a very dangerous condition exists since attempted use of the pits can result in severe electrical shock, and even death.

SUMMARY OF THE INVENTION

The present invention is an improvement in a sub-surface pit having a cover support, a cover having a topside and an underside hingedly mounted on the support above a hollow chamber and hingedly rotatable between raised and seated positions. According to the improvement of the invention, a hollow, concave cup formed of a rigid, water impervious material is provided. The concave cup has an open mouth and is secured to the underside of the cover and disposed so that the open mouth faces downwardly when the cover is seated. In this way the cup is adapted to receive water sensitive equipment and to define an air pocket to protect the water sensitive equipment from flooding when water rises in the chamber above the level of the mouth of the cup. Electrical switches and outlets in particular can thereby be protected by being positioned in such bubble chambers or air pockets, even when the pit becomes entirely flooded.

Preferably, the concave cup is secured to the underside of the cover by means of a hinge mechanism, so that the cup moves in rotation about a hinge connection when the cover is moved between the raised and seated positions. Water-insulated, electrical cables terminating in exposed or water sensitive switches or outlets extend into the inverted cup. The water sensitive equipment is captured within the cup, preferably by a harness. As a consequence, when the pit cover is opened the water sensitive equipment is drawn up with the cup out of the chamber when the pit cover is raised.

A principal object of the invention is to prevent the intrusion of water into an electrical receptacle, even when a pit is flooded and full of water. The inverted cup of the invention forms an air pocket which provides a natural barrier to this intrusion. By raising the hinged pit cover, the cup counter rotates relative to the rotational movement of the pit cover, and remains oriented so that the mouth of the cup continues to face downwardly until the pit cover has been rotated open more than 90 degrees. Since the inverted cup, and the water sensitive outlets or equipment is carried upwardly in rotation with the pit cover, the act of opening the pit cover pulls electrical receptacles or switches within the cup out of the chamber, and out of the flooded area. Once the electrically sensitive equipment has been raised with the cup and free of the flooded chamber, it can be released and removed from the inverted cup and joined with a mating plug. After usage is completed, the electrical receptacle is reinserted into the inverted cup, secured therewithin, and lowered back into the pit. The plug will remain isolated from water and dry even if the pit is completely inundated with water because the cup forms an air capsule over and about the receptacle. If the pit is flooded, rising water can only reach the mouth of the inverted cup, since the air thereabove is entrapped within the cup and forms an air bubble. The pit cover assembly of the invention thereby prevents an electrical receptacle from becoming short circuited even when the pit is flooded.

The invention may be described with greater clarity and particularity by reference to the accompanying drawings.

DESCRIPTION OF THE EMBODIMENT

Figure 1:
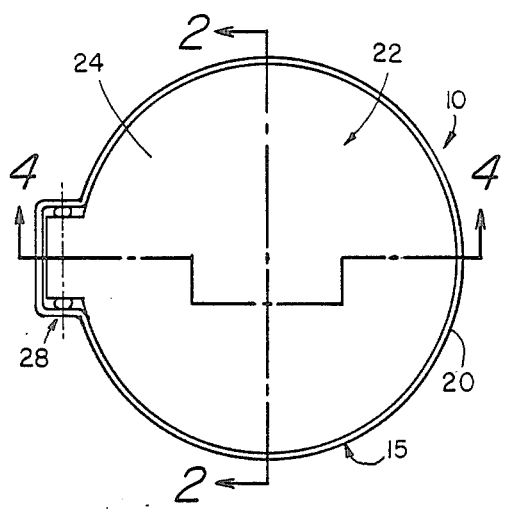
FIG. 1 is a top plan view of a pit cover assembly for a pre-fabricated pit according to the invention.
Figure 2:
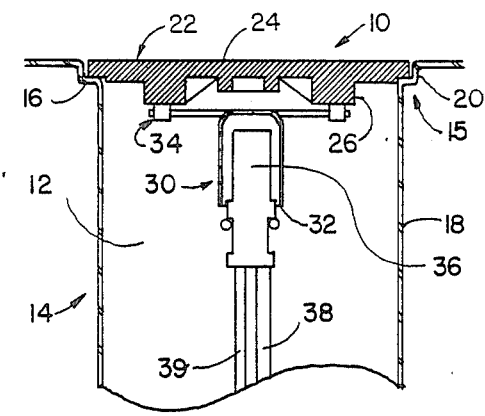
FIG. 2 is a sectional elevational view showing the pit cover in the closed position taken along the lines 2—2 of FIG. 1.
Figure 3:
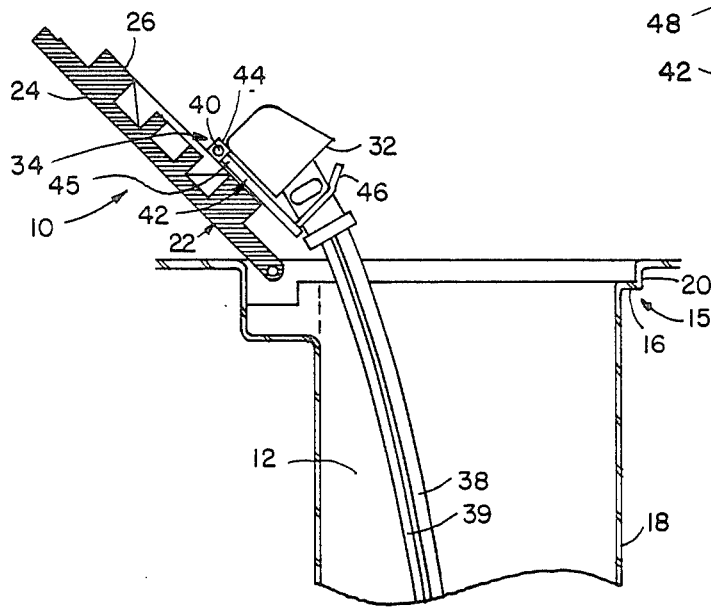
FIG. 3 is a sectional elevational view showing the pit of FIG. 2 filled with water.
Figure 5:
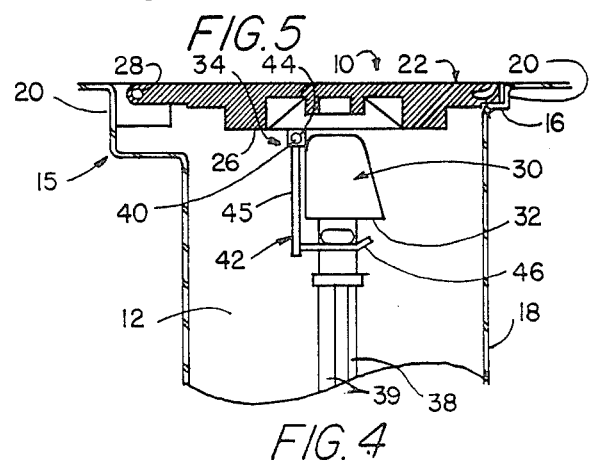
FIG. 5 is a sectional elevational view of the pit of FIG. 4 showing the pit cover in the open position.
Figure 4:
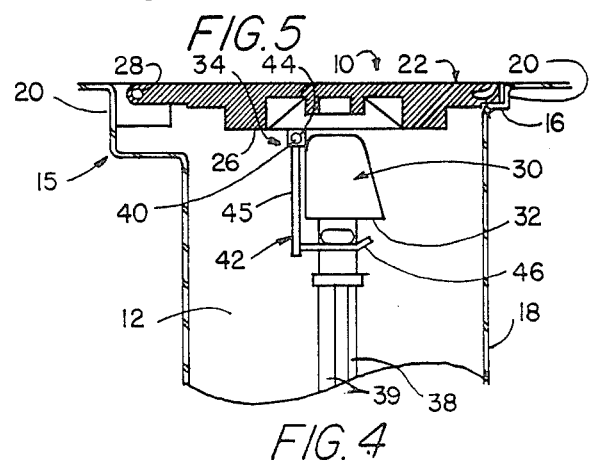
FIG. 4 is a sectional elevational view taken along the lines 4—4 of FIG. 1.

FIG. 1 illustrates a pit cover assembly 10 for a sub-surface chamber 12 defined within a pre-fabricated pit indicated generally at 14 in FIGS. 2-5. A chamber 12 includes a peripheral support in the form of an annular ledge formed by a radial flange 16 extending outwardly from a generally cylindrical body 18 and having an upturned lip 20 at the periphery thereof. A pit cover assembly 10 includes a heavy, generally disk-shaped cover 22 having a top side 24 at its exterior surface and an underside 26 at its interior surface. The cover 22 is hingedly mounted to the supporting ledge by a hinge 28 residing within a pocket in the lip 20. The cover 22 is rotatably moveable between a closed position seated on the supporting ledge 15, as depicted in FIGS. 2, 3 and 4, and an open position raised above the supporting ledge 15, as depicted in FIG. 5. The cover assembly 10 includes a hollow, concave hood 30, shaped generally in the form of a trapezoidal prism. The hood 30 is made of a water impervious material, such as polyvinylchloride, ABS, or polycarbonate, and is closed at one end and has an open mouth 32 at other end. The hood 30 is secured to the underside 26 of the cover 22 by a hinged mechanism indicated generally at 34, and best illustrated in FIGS. 4 and 5. The hood 30 is secured to the underside 26 of the cover 22 so that the open mouth 32 faces downwardly when the cover 22 is in the closed position, as illustrated in FIGS. 2, 3 and 4. The hood 30 is adapted to receive water sensitive particles, such as the electrical plug structure 36 on the ends of the electrical cables 38 and 39 which are housed within the chamber 12. The hood 30 thereby forms an air pocket about the water sensitive plug 36 in the event of a rise in water level in the chamber 12, as illustrated in FIG. 3.

The hinge mechanism 34 is comprised of a steel horizontal hinge axle 40, and a hanger assembly 42 which depends therefrom. The ends of the hinged axle rod 40 extends through axially aligned openings in a pair of depending ears 44 which extend from the underside 26 of the pit cover 22, generally perpendicular to the plane of the pit cover 22. The hanger assembly 42 includes a generally U-shaped frame having legs extending radially from the hinge axle 40. At the remote end of the hanger assembly 42 a pair of arms 46 extend outwardly from the U-shaped frame 45 and turn upwardly and inwardly to capture and releasably hold the plug assembly 36 within the pocket defined within the concave hood 30. The water sensitive equipment or articles housed within the hood 30 are thereby captured therewithin and are drawn out of the chamber 12 with the hood 30 when the cover 22 is raised from the closed position, depicted in FIG. 4, to the open position depicted in FIG. 5. As the cover 22 is moved in rotation, the hood 30 moves in counter-rotation relative thereto. That is, when the cover 22 is rotated counter clockwise from the closed position as viewed in FIG. 4 to the open position viewed in FIG. 5, the hood 30 rotates on the hinged mechamism 34 in clockwise rotation. Conversely, when a cover 22 is moved clockwise from the open position of FIG. 5 to the open position of FIG. 4, the hood 30 moves in counter rotation in a counter clockwise direction relative to the cover 22.

When not in use, the electrical plug 36 is normally held in a stored position proximate to the underside 26 of the pit cover 22 and within a cavity defined within the hood 30 above the mouth 32 thereof as illustrated in FIGS. 2-4. Occasionally, conditions can occur which lead to flooding of the pit 14, as illustrated in FIG. 3. FIG. 3 illustrates the pit 14 in a completely flooded condition in which the level of water 48 has risen to meet the underside 26 of the pit cover 22. In sub-surface pit assemblies of prior design the electrical plug 36 would most certainly short circuit in such conditions. However, in the improved sub-surface 14 according to the invention, this is not the case. With particular reference to FIG. 3, it can be seen that even though the level of water 48 in the chamber 12 has risen all the way up to the underside 26 of the pit cover 22, the electrical plug assembly 36 remains dry and undamaged by virtue of its location within the hood 30. Because the hood 30 is generally in the form of an inverted cup, air originally captured there within can not escape, but is entrapped within the hood 30. As a consequence, the air can not be displaced by water, and the water will rise above the level of the hood mouth 32 within the cavity defined within the hood 30 only to the extent that air is compressed in the cavity defined within the hood 30. The improved pit cover assembly of the invention thereby provides a means for protecting electrical outlets, plugs and other water sensitive equipment within the chamber 12.

Furthermore, in the embodiment of the invention illustrated, the improved pit cover assembly 10 provides a safeguard to personnel who might open the cover 22 while the chamber 12 is flooded. With conventional pit cover assemblies, a person opening the cover 22 of a flooded pit 14 could be subjected to severe electrical shock from short circuited electrical equipment within the pit 14. However, with the present invention, upward rotation of the cover 22 draws the hood 30, and the electrical plug 36 held therewithin by the hanger assembly 42, out of the chamber 12, and completely free from any water within the chamber 12. Once the pit cover 22 has been opened to the position of FIG. 5, the electrical plug 36 can be disengaged for use from the hanger 42. When the electrical plug 36 is no longer needed, it is replaced within the hanger assembly 42, where it is captured and held within the cavity defined within the hood 30. The cover 22 can then again be lowered from the position of FIG. 5 to the position of FIG. 4.

It can be seen that the improved sub-surface pit and the improved cover assembly for a sub-surface chamber, according to the invention, provides a unique and efficient means for safeguarding electrical equipment and other water sensitive articles and equipment, and for protecting personnel who must deal with equipment within the sub-surface chamber. The expense of modifying conventional pit cover assemblies according to the invention is minimal.

Undoubtedly, various modifications and variations of the invention will become readily apparent to those familiar with sub-surface pits and pit cover assemblies. For example, in the embodiment depicted the cover seats directly upon the structure of a prefabricated pit. In other embodiments the cover assembly has an outer frame which seats upon the structure of a pit and an inner door which is hinged relative to the outer frame. Accordingly, the scope of the invention should not be construed as limited to the specific embodiment depicted and described, but rather is defined in the claims appended hereto.

I claim:

1. In a sub-surface pit having a cover support, a cover having a top side and an underside hingedly mounted on said support above a hollow chamber and hingedly rotatable between raised and seated positions, the improvement comprising a hollow, concave cup formed of a rigid, water impervious material and having an open mouth and secured to said underside of said cover by means of a hinge mechanism and disposed so that said mouth faces downwardly when said cover is seated, whereby said cup is adapted to receive water sensitive equipment and to define an air pocket to protect said water sensitive equipment when water rises in said chamber to mouth of said cup, and said cup moves in rotation about said above the level of said hinge connection when said cover is moved between said raised and seated positions.

2. A sub-surface pit according to claim 1 wherein said water sensitive equipment is captured within said cup and is drawn out of said chamber with said cup when said cover is raised.

3. A cover assembly for a sub-surface chamber comprising a peripheral support extending about the upper periphery of said chamber, a cover having a top side and an underside and hingedly mounted to said support and rotatably moveable between a closed position seated on said support and an open position raised above said support, and a hollow concave hood made of water impervious material and having an open mouth and secured to said underside of said cover by a hinge mechanism so that open mouth faces downwardly when said cover is in said closed position, wherein said hood defines a cavity which is adapted to receive water sensitive articles housed within said chamber and to form an air pocket about said water sensitive articles in the event of a rise in water level in said chamber, and said hood moves in counter-rotation relative to said cover when said cover is moved between said closed and said open positions.

4. A cover assembly according to claim 3 wherein said hood is equipped with a hanger assembly adapted to capture said water sensitve articles and hold them within said cavity and to draw said water sensitive articles out of said chamber with said hood where said cover is moved to said open position.

5. A pit cover assembly for a prefabricated pit for servicing aircraft which defines a chamber that houses water sensitive articles comprising a cover having interior and exterior surfaces, hinge means rotatably mounting said cover relative to said pit for movement between open and closed positions, and a moisture impervious, concave cup hingedly mounted on said cover at said interior surface thereof and having an open mouth such that when said cover is closed said mouth of said cup faces downwardly and said water sensitive articles are disposed within said cup, and said cup defines an air pocket therewithin to protect said water sensitive articles even when water rises in said chamber to above the level of said mouth of said cup, and said cup is drawn out of said chamber by said cover when said cover is moved to said open position.

6. A pit cover assembly according to claim 5 in which said concave cup moves in counter-rotation relative to movement of said cover.

7. In a sub-surface pit having a cover support, a cover having a top side and an underside hingedly mounted on said support above a hollow chamber and hingedly rotatable between raised and seated positions, the improvement comprising a hollow, concave cup formed of a rigid, water impervious material and having an open mouth and secured to said underside of said cover and disposed so that said mouth faces downwardly when said cover is seated, whereby said cup is adapted to receive water sensitive equipment and to define an air pocket to protect said water sensitive equipment when water rises in said chamber to above the level of said mouth of said cup, and means coupled to said underside of said cup for capturing said water sensitive equipment and for holding said water sensitive equipment within said cup so that said water sensitive equipment is drawn out of said chamber when said cover is rotated to said raised position.

8. A cover assembly for a sub-surface chamber comprising a peripheral support extending about the upper periphery of said chamber, a cover having a top side and an underside and hingedly mounted to said support and rotatably moveable between a closed position seated on said support and an open position raised above said support, and a hollow concave hood made of water impervious material and having an open mouth and secured to said underside of said cover so that open mouth faces downwardly when said cover is in said closed position, wherein said hood defines a cavity which is adapted to receive water sensitive articles housed within said chamber and to form an air pocket about said water sensitive articles in the event of a rise in water level in said chamber, and means for capturing said water sensitive articles and holding said water sensitive articles within said cavity as said cover is moved between said closed position and said open positions.

9. A pit cover assembly for a prefabricated pit for servicing aircraft which defines a chamber that houses water sensitive articles comprising a cover having interior and exterior surfaces, hinge means rotatably mounting said cover relative to said pit for movement between open and closed positions, and a moisture impervious, concave cup having an open mouth and mounted on said cover at said interior surface thereof such that when said cover is closed said mouth of said cup faces downwardly and said water sensitive articles are disposed within said cup, and said cup defines an air pocket therewithin to protect said water sensitive articles even when water rises in said chamber to above the level of said mouth of said cup, and means for capturing said water sensitive articles and for holding said water sensitive articles within said cup, whereby said water sensitive aritcles are drawn out of said chamber when said cover is moved from said closed to said open position.

* * * * *